UNITED STATES PATENT OFFICE.

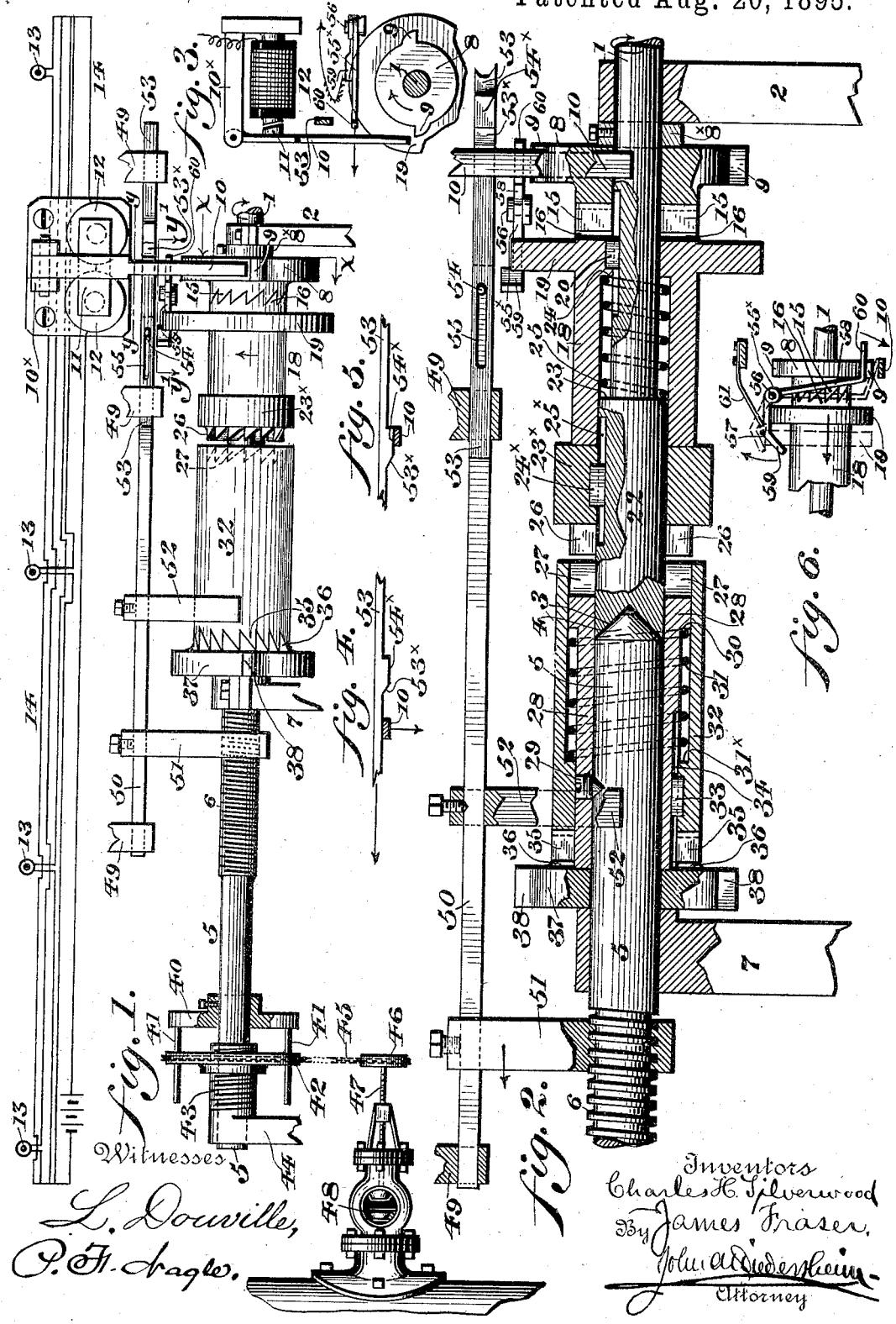

CHARLES H. SILVERWOOD AND JAMES FRASER, OF PHILADELPHIA, PENNSYLVANIA.

OPERATING THROTTLE-VALVES OF ENGINES.

SPECIFICATION forming part of Letters Patent No. 544,867, dated August 20, 1895.

Application filed May 21, 1895. Serial No. 550,048. (No model.)

*To all whom it may concern:*

Be it known that we, CHARLES H. SILVERWOOD and JAMES FRASER, citizens of the United States, residing in the city and county of Philadelphia, State of Pennsylvania, have invented a new and useful Improvement in Apparatus for Automatically Operating Throttle-Valves of Engines and other Motors, which improvement is fully set forth in the following specification and accompanying drawings.

Our invention consists of a novel construction of apparatus for automatically closing throttle-valves of engines and other motors from a distance, whereby said valve can be operated from any part of a mill or other point within an electric circuit by pressing a button, means being thus provided for instantly cutting off the supply of steam or other fluid motive power from the engine, and thereby effecting the stoppage of the machinery instantly, which is oftentimes desirable in cases of accident, thereby preventing damage to the machinery and loss of life or limb.

It also consists of novel safeguards for preventing any injury to any part of the apparatus.

It further consists of novel details of construction, all as will be hereinafter set forth.

Figure 1 represents a side elevation of an apparatus for automatically operating the throttle-valves of engines or other motors embodying our invention. Fig. 2 represents, on an enlarged scale, a longitudinal section through a portion of the same, certain of the parts being shown in elevation. Fig. 3 represents a section on line $x\,x$, Fig. 1, showing the arrangement of the magnets and the manner of throwing the device into operation. Figs. 4 and 5 represent sections on line $y\,y$, Fig. 1, showing the different positions certain parts of the apparatus assume, to be hereinafter referred to. Fig. 6 represents a detail plan view, taken on line $y'\,y'$, Fig. 1, of a portion of the apparatus, viewed in the direction of the arrows, showing the construction and arrangement of the device for preventing the parts from injury when the electrical apparatus is operated.

Similar figures of reference indicate corresponding parts in the several views.

Referring to the drawings, 1 designates the main shaft of the engine, the same being supported in a suitable bearing 2 and having its extremity provided with a counterbore 3, in which is adapted to rest the pointed or conical-shaped end 4 of the shaft 5, which is provided with a screw-threaded portion 6, said shaft 5 being supported in a suitable bearing 7.

8 designates a disk which is mounted upon said main shaft 1 so as to be freely rotated thereupon, said disk being separated from the bearing 2 by means of the collar $8^\times$.

9 designates lugs which are located, preferably, diametrically opposite each other upon said disk 8, the arrangement of the same being best seen in Fig. 3.

10 designates a bar which is pivoted to a suitable support $10^\times$ and has attached thereto an armature 11, which is adapted to be attracted by means of the magnets 12, when the circuit is made in said magnet, by pressing any of the push-buttons 13 of the electric circuit 14, which it will be understood is to be in communication with a battery or any other suitable source of electric energy, as will be understood from the upper portion of Fig. 1. The said disk 8 has attached to the face thereof a serrated or ratchet-like portion 15, which is adapted to engage a similar serrated face or outline 16 of the sleeve 18, the same being provided with a flange 19, whose function will be hereinafter referred to, said sleeve 18 having attached to a suitable portion of the inner bore thereof the feather 20, which permits said sleeve 18 to move longitudinally on the shaft 1, the latter, however, being rotatable in unison with said sleeve 18, the relative positions of the horizontal and inclined portion of the above serrated faces being best seen in Fig. 1. The extremity of said main shaft 1, which is provided with the counter-bore 3, has for a portion of its length the enlargement 22, the shoulder 23 of which serves as an abutment for an end of the spring 25, the other end of the latter abutting against the shoulder 24 of said sleeve 18.

$23^\times$ designates a collar which rotates in unison with the portion 22 of said main shaft 1, but which is provided with a feather $24^\times$, which engages the walls of the groove $25^\times$ of said portion 22, said collar $23^\times$ thus being capable of longitudinal movement relative to the shaft 22, but being compelled to rotate in unison therewith.

26 designates a serrated or ratchet-faced portion which is attached to said collar 23$^\times$, and which is adapted to engage the serrated portion 27 of the inner sleeve 28, which is held in position upon said shaft 5 by means of the pin 29, said sleeve 28 being provided with a shoulder 30, against which abuts one end of the spring 31, the other end of the latter abutting against the shoulder 31$^\times$ of the outer sleeve 32, it being noted that the diameters of the shafts 5 and 22 are substantially the same. The said sleeve 32 is provided with a feather 33, which engages a groove 34 in the sleeve 28, whereby said sleeves 28 and 32 are compelled to rotate in unison, the outer sleeve 32 being movable longitudinally relatively to the said sleeve 28, the latter, however, being incapable of longitudinal movement, as will be evident.

35 designates a ratchet-faced portion on the end of said sleeve 32, which is adapted to engage a similar serrated or ratchet-faced portion 36, which is attached to the collar or disk 37, which is freely rotatable upon the shaft 5 and is provided with the lugs or projections 38, which are preferably located diametrically opposite to each other in substantially the same manner as are the lugs 9 of the disk 8, as has been described. In Figs. 1 and 2 it will be seen that the said shaft 5 is provided with the threaded portion 6, the same having preferably square threads in the present instance, beyond which extends the said shaft 5, which has the disk 40 attached thereto, so as to rotate in unison therewith, said disk having pins 41 projecting therefrom which pass through holes or spokes in the sprocket-wheel 42, which is internally threaded and is mounted upon the stationary threaded cylinder 43, which is supported on the post 44, the said shaft 5 passing through said cylinder 43 and having its bearing therein, as will be understood from Fig. 1, the other end of said shaft 5 having its bearing in the post 17 and the end of the shaft 22.

45 designates a sprocket-chain which passes around the said wheel 42 and engages the sprocket-wheel 46, which is attached to the valve-stem 47 of the valve 48, whereby the latter can be actuated, as will be hereinafter explained.

49 designates suitable ways or guides in which is supported the bar 50, which has attached thereto the arm 51, which has an internally-threaded portion engaging with the threaded portion 6 of the shaft 5.

52 designates a depending arm which is attached to the bar 50 and is adapted to contact with the lugs or projections 38 on the disk 37, as will be explained.

53 designates a bar supported adjacent said bar 50, the same being provided with a slot 55 in which works a pin 54 on said bar 50, the bar 53 being provided with an inclined portion 53$^\times$ and a raised portion 54$^\times$, which are adapted to contact with the arm 10 and move the same out of its engagement with the lugs 9, as will be explained.

55$^\times$ designates a bell-crank, which is pivoted at 56 and consists of the members 57 and 58, said members having their extremities 59 and 60, respectively, bent, as is best seen in Fig. 6, said bell-crank being normally held in the position seen in full lines by means of a spring 61, which is suitably supported, the free end of said spring being upon an arm of said bell-crank, the bent end 59 of the latter being adapted to be struck by the flange 19, while the bent end 60 of said bell-crank is adapted to contact with the arm 10, as will be hereinafter explained.

The operation is as follows: If we assume the main shaft 1 to be rotating in the direction of the arrow, it will be seen that the sleeve 18 and the collar 23$^\times$ will also rotate in the same direction, and by reason of the engagement of the serrated portions 15 and 16 the disk 8 will also rotate in the same direction, the spring 25 tending normally to keep the sleeve 18 in contact with the serrated portion of the disk 8, the parts being now in the position seen in Figs. 1 and 2. If, now, it should be desired, for any reason whatever, to suddenly stop the revolution of said main shaft 1 because of injury to any person or accident to the machinery in any part of the mill or place where the apparatus is situated, by pressing the push-button 13 the electric circuit will be completed, and thus the arm 10 will be drawn toward the magnets, as will be understood from Fig. 3, and the free end of said arm will immediately contact with one of the lugs 9 and the rotation of the disk 8 will cease, as will be apparent. The cessation of the rotation of said disk 8 will cause the sleeve 18 to immediately move to the left from the position seen in Fig. 1, its serrated portion riding upon the now stationary serrated portion of said disk 8, and the collar 23$^\times$ will also be moved to the left, so that its serrated face or teeth 26 will be locked with the teeth 27, it being remembered that said sleeve 18 and collar 23$^\times$ are constantly rotating in unison with the shaft 1, and said rotation will now be imparted to the inner sleeve 28 by reason of the engagement of said serrated portions 26 and 27, and as said sleeve 28 is pinned to the shaft 5 the latter will rotate therewith and will now for the time being be rotating at the same speed as the shaft 1, thereby rotating the said portion 6 and causing also to rotate the disk 40, the pins 41 of which, by their engagement with the sprocket-wheel 42, will cause the latter to rotate, and this rotation will be imparted to the sprocket-wheel 46, whereby the valve-stem 47 will be rotated and the valve 48 will be instantly closed, and the motive fluid being cut off from the engine or motor the movement of the same will stop. While the above movements have been taking place the movement of the flange 19 to the left will move the bell-crank 55× into the position seen dotted in Fig. 6, the bent end 60 of the same contacting with the lever 10 and thereby moving the same out of engagement with the lugs 9, as will be understood from Figs. 3 and 6, after which, by reason of the spring 25, the teeth of the sleeve 18 will be in engagement with the teeth of the disk 8 and said sleeve and disk will again be rotating in unison, the spring 61 causing the bell-crank to assume the position seen in full lines in Fig. 6 when the flange 19 has moved to the right again.

The operation of the device for preventing injury to any of the parts by reason of the operator keeping his finger on the push-button too long is as follows: The engagement of the bar or traveler 51 with the threaded portion 6 will cause the bar 50 to move to the left, and the pin 54, contacting with the left-hand extremity of the slot 55, will move the bar 53 from the position seen in Figs. 2 and 4 to the position seen in Fig. 5, the raised portion 54× contacting with the bar 10, and thus moving the latter positively out of engagement with the lugs 9 at about the same time as the bar or dog 52 reaches the lugs 38 on the disk 37, the effect of which is evident. It will thus be seen that provision is made for positively closing the valve and for also preventing any injury to the same, or to any other part of the apparatus. It will further be evident from the foregoing that the stoppage of the rotating disk 8 in any suitable manner will throw the device for closing the throttle into operation, and it will of course be evident that the arrangement of the electric device may be somewhat varied according to requirements, so as to come within the scope of our invention, and it will further be noted that under normal conditions the sleeves 32 28 and the shaft 5 are stationary, the sleeve 28 rotating only when the rotation of the disk 8 ceases, whereby the teeth 26 and 27 are thrown into engagement, and substantially as soon as the rotation of the disk 37 is stopped by its engagement with the dog 52 the arm 10 is thrown out of engagement with the lugs 9, as has been explained, the tension of the spring 31 causing its adjacent parts to assume their proper positions relative to each other, the spring 25 having a similar function—viz: to keep the sleeve 18 in the proper position relative to said main shaft 1 and disk 8.

Having thus described our invention, what we claim as new, and desire to secure by Letters Patent, is—

1. In an apparatus of the character described, a main shaft, a secondary shaft suitably supported, a disk mounted on said main shaft and having projections thereon, an electric circuit having a magnet therein, an armature with a rod adapted to engage said projections, a valve having its stem actuated by a disk on said secondary shaft, and a clutch mechanism connected with said shafts for causing the same to rotate together on the stoppage of the rotation of the said disk on the main shaft, said parts being combined substantially as described.

2. In an apparatus of the character described, a main shaft having the disk 8, loosely mounted thereon and having a clutch connection therewith, an electric circuit having a magnet, an armature with a rod engaging a projection on said disk, a secondary shaft, a valve connected with a disk on said secondary shaft so as to be operated by the rotation of said shaft, clutch mechanism connected with said main and secondary shafts for uniting the same, on the stoppage of the rotation of the said disk on the main shaft, a sliding bar having a pawl connected therewith, and the collar 37 freely mounted on said secondary shaft and provided with the lugs 38 said collar having a clutch connection with said secondary shaft, said parts being combined substantially as described.

3. In an apparatus of the character described, a main rotatable shaft with a disk loosely mounted thereon and having a clutch connection so as to rotate therewith, mechanism for stopping the rotation of said disk independent of said shaft, a secondary shaft, a valve having mechanism connecting it with said secondary shaft so as to be operated by the rotation of the said shaft, and clutch mechanism on said shafts for connecting the same on the stoppage of the rotation of the said disk on the main shaft, said parts being combined substantially as described.

4. In a device of the character described, a throttle valve, a main shaft 1, having the enlarged portion 22 a counter sunk end, a shaft 5 engaging the same, having the threaded portion 6, means connected with said shaft for actuating the throttle valve, and means for stopping the rotation of said shaft 5 when said throttle valve is closed, substantially as described.

5. In a device of the character described, the main shaft 1 having the enlarged portion 22, the disk 8 flanged sleeve 18, and collar 23× mounted upon said shaft, a spring 25 common to said shaft and sleeve, means for causing the latter and the disk to rotate in unison, the shaft 5 having the under sleeve 28 attached thereto, means for causing said sleeve and collar to rotate in unison, an outer sleeve mounted upon said under sleeve, a spring common to both, means for causing said collar and inner sleeve to rotate in unison, a disk having lugs thereon, connections from said shaft 5 adapted to operate a throttle valve, in combination with means for throwing the device into or out of operation, substantially as described.

6. In a device of the character described, a throttle valve, the shafts 1 and 5, the disks 37 and 8 mounted thereon, clutch mechanism intermediate said disks, means for stopping the rotation of said disks, in combination with means for allowing one of said disks to rotate when said valve has been operated, substantially as described.

7. In a device of the character described, a throttle valve, the shafts 1 and 5, the disks 8 and 37 mounted thereon, electrically controlled devices for stopping the rotation of one of said disks, clutch mechanism intermediate the latter, a spring pressed bell crank for throwing said devices out of operation, in combination with means for preventing injury to said valve, substantially as described.

8. In a device of the character described, a throttle valve, a sprocket wheel mounted on the stem thereof, another internally threaded sprocket wheel mounted upon a threaded cylinder adjacent the former, a rotatable shaft having its bearing within said cylinder, a disk mounted on said shaft, and having pins engaging said sprocket wheel, in combination with clutch mechanism, a portion of which is mounted upon said shaft, electrically controlled devices for throwing said clutch mechanism into operation, and means for throwing said mechanism out of operation when said valve has been actuated, substantially as described.

CHARLES H. SILVERWOOD.
JAMES FRASER.

Witnesses:
EDWIN F. SCHIVELY,
SIDNEY E. SMITH.